(No Model.)

G. F. GODLEY.
CAR AXLE BOX.

No. 451,195. Patented Apr. 28, 1891.

WITNESSES:
Wm. H. Van Horn.
M. Walker

INVENTOR
George F. Godley
By S. J. Van Stavoren
ATTORNEY

United States Patent Office.

GEORGE F. GODLEY, OF PHILADELPHIA, PENNSYLVANIA.

CAR-AXLE BOX.

SPECIFICATION forming part of Letters Patent No. 451,195, dated April 28, 1891.

Application filed February 18, 1890. Serial No. 340,857. (No model.)

*To all whom it may concern:*

Be it known that I, GEORGE F. GODLEY, a citizen of the United States, residing at Philadelphia, in the county of Philadelphia and State of Pennsylvania, have invented certain new and useful Improvements in Car-Axle Boxes; and I do hereby declare the following to be a full, clear, and exact description of the invention, such as will enable others skilled in the art to which it appertains to make and use the same.

Figure 1:
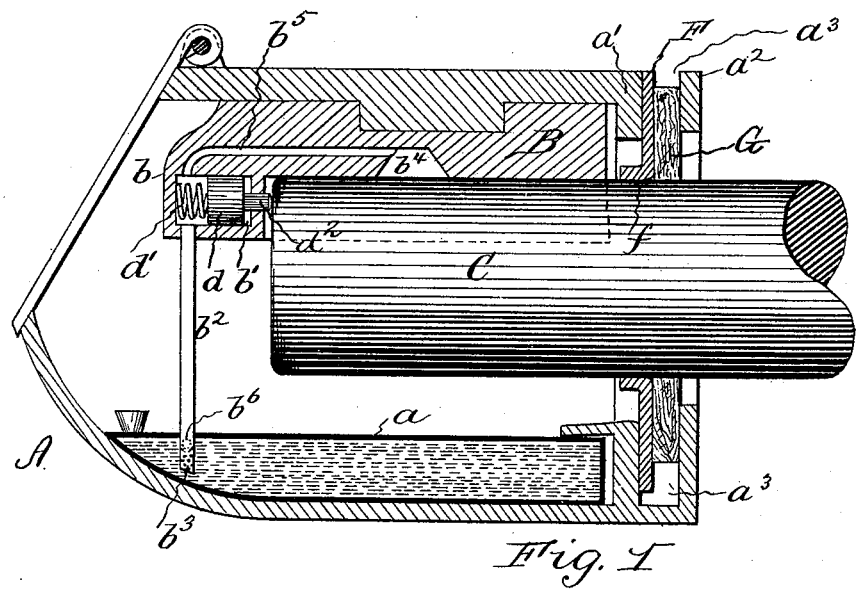
Figure 2:
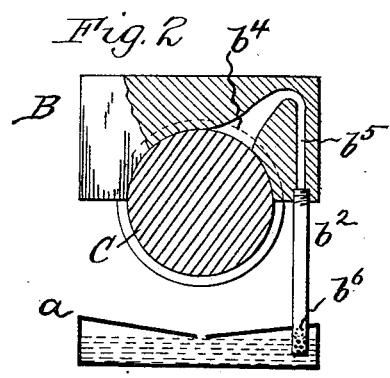
Figure 3:
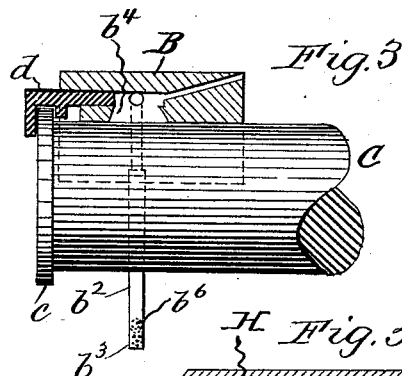
Figures 4, 5:
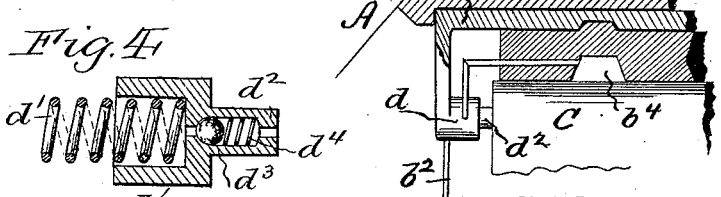

My invention has relation to car-axle boxes, particularly to the oiling devices and the dust-shields thereof for the axle-journals; and it has for its object a simple and effective form of oiling device secured to or forming a part of the journal brass or bearing, and is operated by the end-thrust of the axle to convey oil from the box to the journal.
My invention accordingly consists of the combinations, constructions, and arrangements of parts, as hereinafter described in the specification, and pointed out in the claims.
Reference is had to the accompanying drawings, wherein Figure 1 is a longitudinal section of an axle-box with axle-journal in elevation, showing an oiling device and dust-shield embodying my improvements. Fig. 2 is a cross-section of axle-journal brass or bearing, box oil-reservoir, and a modification of oiling device. Fig. 3 is a longitudinal section, partly in elevation, of the same. Fig. 4 is an enlarged sectional view of the form of oil-pump illustrated in Fig. 1; and Fig. 5 is a sectional view of part of the axle-box with key for the brass or bearing, showing the pumping devices secured to said key.

A represents an axle-box of any suitable form, which may, if desired, be provided with a closed separate oil-reservoir $a$, located, preferably, at the bottom of box A, or such bottom part of box A may of itself be used for holding oil.
B represents the brass or bearing for the axle-journal C, which brass may be of any suitable form and material, and, as shown in Fig. 1, has a projecting front end $b$, which depends in front of the axle, as illustrated, and is formed with a chamber $b'$, in which is located a pump-plunger, preferably hollow, of any suitable kind, as indicated at $d$, and provided with an outer closed end projecting through chamber $d$ for contact with the end of the car-axle. In this hollow or tubular part of the plunger $d$ and abutting at one end against a shoulder or one of the walls of chamber $d$ is a reacting spring $d'$. From chamber $b'$ leads a pipe $b^2$, the lower end $b^3$ of which enters the box oil-reservoir, and is suitably perforated, as shown, if desired. From chamber $b'$ proceed other pipes or ducts $b^5$, leading, preferably, through the brass or bearing B to a transverse or other suitably located recess or recesses $b^4$ on its under side, and which form oil-chambers in said brass or bearing B, contiguous with the axle-journal C, for lubricating said parts. In the end $b^3$ of pipe $b^2$, or at any suitable point within its bore, is located a ball or other suitable gravity suction-acting valve $b^6$. The end-thrust of the axle and the reaction of spring $d'$ actuate plunger $d$ to raise oil from chamber $a$ to and through chamber $b'$ and duct $b^5$ to recess or recesses $b^4$. The depressed end $b$ of the brass or bearing B also serves as a stop-bar for limiting the end-thrust of the axle, so that said brass, when constructed as shown in Fig. 1, carries or is provided with said stop-bar and with an oiling device or pump which is actuated by the end-thrust of the axle. When this construction is used, the end $d^2$ of plunger $d$ may be made tubular and provided with a ball or check valve $d^3$, with reacting spring $d^4$, as shown more plainly in Fig. 4, to admit of the escape from chamber $d'$, by the way of the hollow plunger and end $d^2$, of a small supply of oil for lubricating the end of the axle and those parts of the plunger $d$ and of the brass or bearing B which contact therewith.

If desired, the projecting and depending front end $b$ on the brass B may be dispensed with, in which case the plunger $d$ slides in a suitably-formed opening in the brass and has a bifurcated or recessed outer end engaging with the end collar $c$ on the axle, and the pipe $b^2$ connects with the recess or recesses $b^4$ in the brass B. (See more plainly Figs. 2 and 3.)

From the foregoing it is evident that various constructions of pumping devices may be secured to or form part of the brass or bearing, and hence I do not limit myself to those shown and described.

The dust-shield for the rear end of the box may be of any suitable construction; but in the drawings I have shown the same composed of a sheet-metal plate F, preferably of steel, having a central opening $f$ snugly fitting the axle, said central opening having preferably a flanged or upset edge to provide a suitable bearing-surface of the plate F on the axle. Said plate F is located between the usual or other double walls $a'$ $a^2$ at the rear end of box A, or in a chamber $a^3$ between said walls, or at the rear end of the box, said chamber $a^3$ having preferably an open top $a^4$. The plate F abuts against the rear face of the front wall $a'$, and between the plate F and the front face of the rear wall $a^2$ is a packing of any suitable material—such, for instance, as a plate of wood, a layer of red fiber, felt, or other analogous yielding or elastic material G—having a central opening to fit the axle. Said packing maintains the plate F in position to seal it against the rear face of the front wall $a$, and also seals chamber $a^3$ to effectually exclude dust and prevent the escape of oil from the box.

I do not herein claim the construction of dust-shield shown and described, as the same forms the subject-matter of a separate application filed July 23, 1890, Serial No. 359,656.

When axle-box brasses or bearings are provided with a key H, as shown in Fig. 5, the pumping devices may be secured to said key, as indicated; and my invention comprises the same, as said key is in effect a part of the brass or bearing, or said key may be a part of the top of the box.

What I claim is—

1. In a car-axle box, the combination of an axle-journal, a brass or bearing for said journal, an oil pumping or lifting device, and mechanism between said pump and the axle and operated by the end-thrust of the axle independently of its rotary motion to convey or conduct oil to said journal or bearing, substantially as and for the purpose set forth.

2. An axle-box brass or bearing having a projecting and depending front end forming a stop-bar for the end of a car-axle, and a plunger in said front end of the brass and actuated by the end-thrust of the axle, substantially as set forth.

3. An axle-box brass or bearing having a projecting and depending front end forming a stop-bar for the end of a car-axle, and oil-pumping devices attached to said brass end and actuated by the end-thrust of the axle, substantially as set forth.

4. An axle-box brass or bearing having projecting front end $b$, a chamber $b'$ in said end, a plunger with reacting devices in said chamber, a pipe $b^2$, with check-valve, depending from said chamber, recess or recesses $b^4$ on the under side of said brass, and duct $b^5$, connecting said recess with chamber $b'$, substantially as set forth.

5. In combination with an axle-box brass or bearing, a hollow pump-plunger containing a reaction-spring and operated by the end-thrust of the axle, substantially as set forth.

In testimony whereof I affix my signature in presence of two witnesses.

GEORGE F. GODLEY.

Witnesses:
JOHN RODGERS,
S. J. VAN STAVOREN.